P. F. FREY.
ELECTRIC CONDUCTOR.
APPLICATION FILED MAY 27, 1918.
1,327,542.
Patented Jan. 6, 1920.
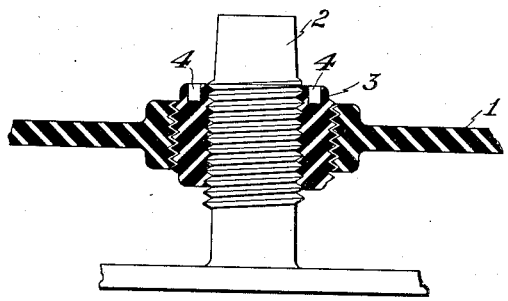
WITNESS:
INVENTOR.
Peter F. Frey.
BY
ATTORNEY.

UNITED STATES PATENT OFFICE.

PETER F. FREY, OF NIAGARA FALLS, NEW YORK, ASSIGNOR TO U. S. LIGHT & HEAT CORPORATION, OF NIAGARA FALLS, NEW YORK, A CORPORATION OF NEW YORK.

ELECTRIC CONDUCTOR.

1,327,542.   Specification of Letters Patent.   Patented Jan. 6, 1920.

Application filed May 27, 1918. Serial No. 236,747.

*To all whom it may concern:*

Be it known that I, PETER F. FREY, a citizen of the United States, residing at Niagara Falls, in the county of Niagara and State of New York, have invented new and useful Improvements in Electric Conductors, of which the following is a specification.

The present invention relates to electric conductors.

More particularly the present invention relates to constructions whereby an electric conductor may extend through a wall, the creepage of liquid therealong being prevented. The present invention is illustrated and described in connection with storage battery construction.

An object of the present invention is to provide a simple construction whereby an electric conductor may extend through a wall and the creepage of liquid therealong may be prevented.

A further object is to provide a construction for storage batteries which will be simple to assemble and disassemble and inexpensive and effectual in operation to prevent the creepage of electrolyte from the interior to the exterior of the cell along the cell posts.

Further objects will appear as the description proceeds.

The one figure of the drawing represents one embodiment of the present invention.

The numeral 1 represents a wall. This wall may be one of the side walls or the cover of a storage battery and should be provided with a second threaded aperture. Extending through said aperture is an electric conductor 2 which may be the cell post of a storage battery. Said cell post is screw threaded as shown in the drawing. A bushing 3 is provided, screw-threaded on both its internal and external diameters whereby to engage with the screw-threaded conductor 2 and the screw-threaded portion of the wall 1. When the bushing 3 is screwed in place between the conductor 2 and the wall 1, it should form such intimate contact with both of said members as to prevent the passage of liquid therebetween. One side of the bushing 3 should be provided with a plurality of holes 4, 4, whereby a spanner wrench may be used for turning the bushing 3.

In assembling the conductor 2 within the wall, the bushing 3 will be screw-threaded into the wall at the same time that it is threaded on to the post 2. A tight joint will be provided which will effectually prevent the passage of electrolyte. The bushing 3 may be readily removed whenever necessary, without the danger of breaking the cover.

One embodiment of the present invention has been described in detail. Many modifications will occur to those skilled in the art. It is intended in this patent to cover all such modifications that come within the scope of the present invention as defined by the appended claim.

What I claim as new and desire to secure by Letters Patent of the United States is:—

In storage battery construction having a cell post extending through the cover, a bushing screw-threaded to both the post and the cover and filling up the space between said post and said cover.

In witness whereof I have hereunto subscribed my name.

PETER F. FREY.